United States Patent [19]
Abbott

[11] 3,932,835
[45] Jan. 13, 1976

[54] TOWABLE VLF SONAR PROJECTOR
[75] Inventor: Frank R. Abbott, San Diego, Calif.
[73] Assignee: The United States of America as represented by the Secretary of the Navy, Washington, D.C.
[22] Filed: Sept. 25, 1974
[21] Appl. No.: 508,925

[52] U.S. Cl. .................. 340/7 R; 340/8 PC; 340/9
[51] Int. Cl.² ..................................... H04R 1/44
[58] Field of Search ........ 340/7 R, 7 PC, 8 R, 8 PC, 340/9, 10, 17, 3 T

[56] References Cited
UNITED STATES PATENTS
| | | | |
|---|---|---|---|
| 2,429,104 | 10/1947 | Olson | 340/8 PC |
| 2,978,672 | 4/1961 | Barney | 340/8 PC |
| 3,480,907 | 11/1969 | King | 340/9 |

Primary Examiner—Richard A. Farley
Attorney, Agent, or Firm—Richard S. Sciascia; Ervin F. Johnston; Thomas Glenn Keough

[57] ABSTRACT

An improved line array transducer increases its effectiveness by ensuring a more responsive trailing as it is towed through the water. An elongate sleeve contains a number of longitudinally spaced transducer elements which are responsive for the transmission or reception of acoustic energy. An interconnected, flexible bladder carried inside of a towing is coupled to the elongate sleeve. As the paravane leads the line array to its predetermined operational depth, the more compliant bladder yields to the pressure and is compressed. This compression of the bladder forces a contained gas into the interior of the elongate sleeve and the transducer's interiors to pressure compensate the array. By suitably choosing the materials and appropriately dimensioning the bladder, sleeve and transducer elements, an essentially neutrally buoyant line array is fabricated for deployment at the predetermined operational depth. Such an array trails responsively and does not generate excessive flow noise.

4 Claims, 5 Drawing Figures

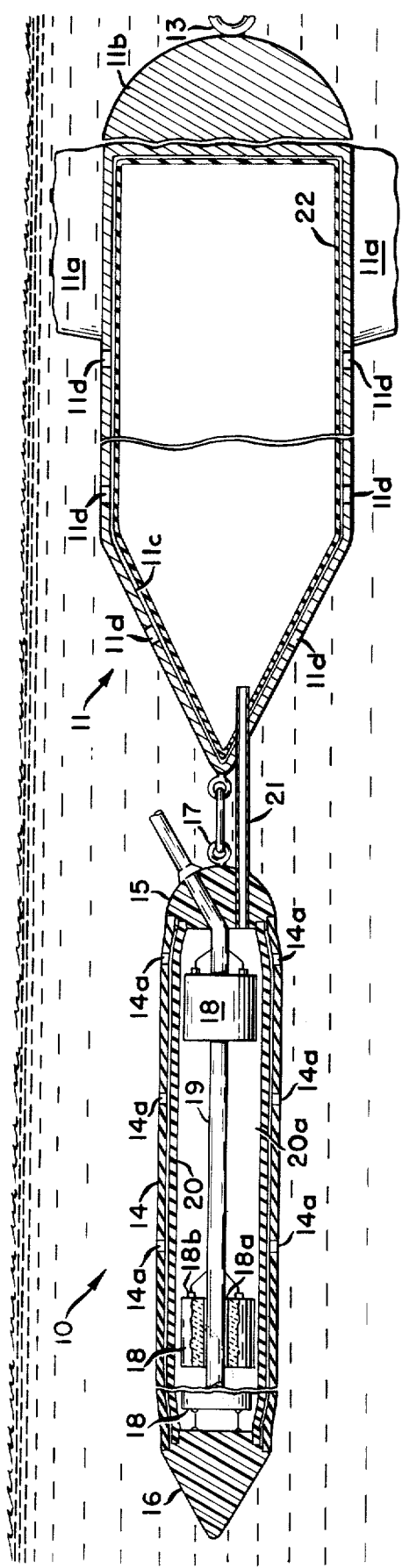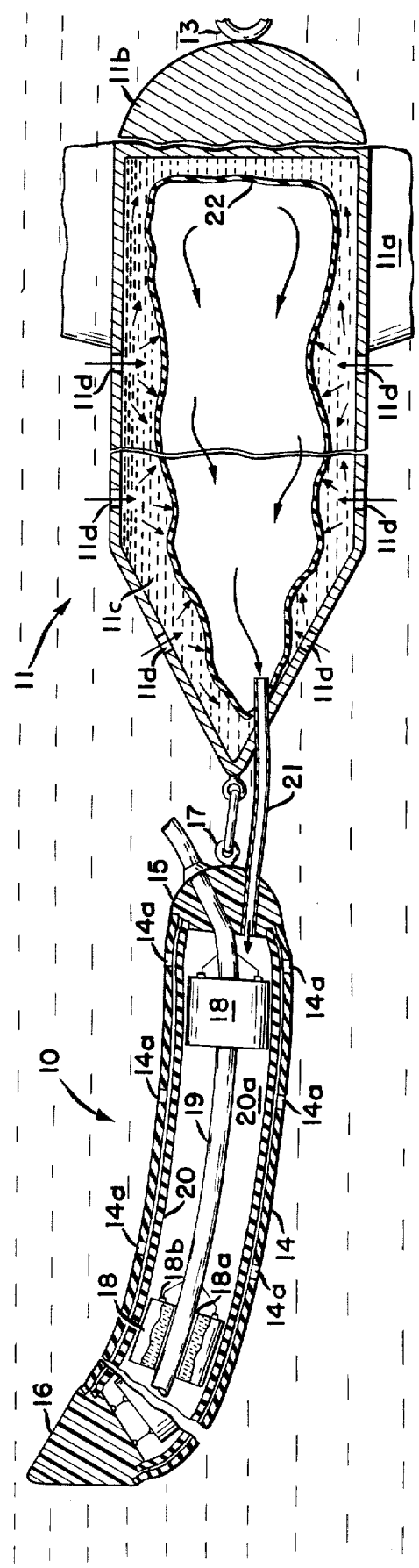

U.S. Patent  Jan. 13, 1976  Sheet 3 of 3  3,932,835 ical applications resulted in the development of the so-called line array transducer, which optionally functions in the active mode, passive mode, or a combination of both. The usual procedure relies on a surface ship towing a paravane device at a preset depth via a towing cable. Behind the paravane, a hose-like line array is played out a predetermined distance and electrical conductors pass signals back-and-forth between the ship and the array. However, most arrays possess an inherent defect which limits the level of performance, particularly when they function in the passive mode. This defect resides in their inability to trail responsively. That is to say, the tail-end of the array does not lie in the same horizontal plane as the head of the array, due to inadequate, or the lack of, responsive buoyancy compensation. Having the tail-end fall below or rise above the head of the array generates an excessive amount of turbulence and flow noise and seriously degrades the array's performance. Fluid-fulled arrays fabricated with flotation elements along their length have been designed and, since they are nearly neutrally buoyant, responsive trailing will result within predetermined operational depths. Yet, sensitivity is sacrified employing fluid-filled transducers as compared to the gas-filled type. One noteworthy attempt to produce a pressure compensated towed array is disclosed in a U.S. Pat. No. 3,868,623 "Towable Sonar Array". In that patent the present inventor discloses a scheme for transferring a heavy liquid, such as mercury, along the array to weight compensate the array as gas contained within the array is compressed or expanded in response to changing depths. While this approach is sound, a less complicated pressure compensation arrangement might be desirable under certain circumstances. Thus, there is a continuing need in the state-of-the-art for a sensitive, towed line array which trails responsively at a predetermined depth and which is not overly complicated to enhance reliability.

TOWABLE VLF SONAR PROJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Transducers of acoustic energy are many and varied in design. Seismic explorations and a variety of military

SUMMARY OF THE INVENTION

This invention is directed to providing an improved transducer of acoustic energy. An elongate sleeve enclosing a gas-filled space, having a first stiffness, contains a number of transducer elements, each of which have a hollow interior communicating with the gas-filled space. A flexible bladder defines a gas-filled chamber and is coupled to the elongate sleeve. The bladder has a stiffness which is more compliant than the first stiffness of the elongate sleeve. As a consequence, when the elongate sleeve and flexible bladder are subjected to identical ambient pressure changes, the more compliant bladder yields before the elongate sleeve and gas is transferred between the bladder and the elongate sleeve to pressure compensate all the transducer elements.

A prime object of the invention is to provide an improved towed line array.

Another object is to provide an array which is essentially neutrally buoyant at a predetermined depth.

Still another object is to provide a line array which creates less flow noise as it is towed through the water.

Yet another object is to provide a relatively uncomplicated pressure compensation technique for increasing the reliability and effectiveness of a towed line array.

Still another object of the invention is to provide an essentially neutrally buoyant towed line array which pressure compensates hollow transducer elements for increased sensitivity.

These and other objects of the invention will become more readily apparent from the ensuing specification when taken with the drawings.

BRIEF DESCRIPTION OF THE DRAWINGS

FIG. 2a shows a cross-sectional representation of the invention taken generally along lines 2—2 in FIG. 1, as it is deployed near the surface.

FIG. 2b is a cross-sectional view of the invention taken generally along lines 2—2 in FIG. 1, as it approaches its operational depth.

DESCRIPTION OF THE PREFERRED EMBODIMENT

Figure 1:
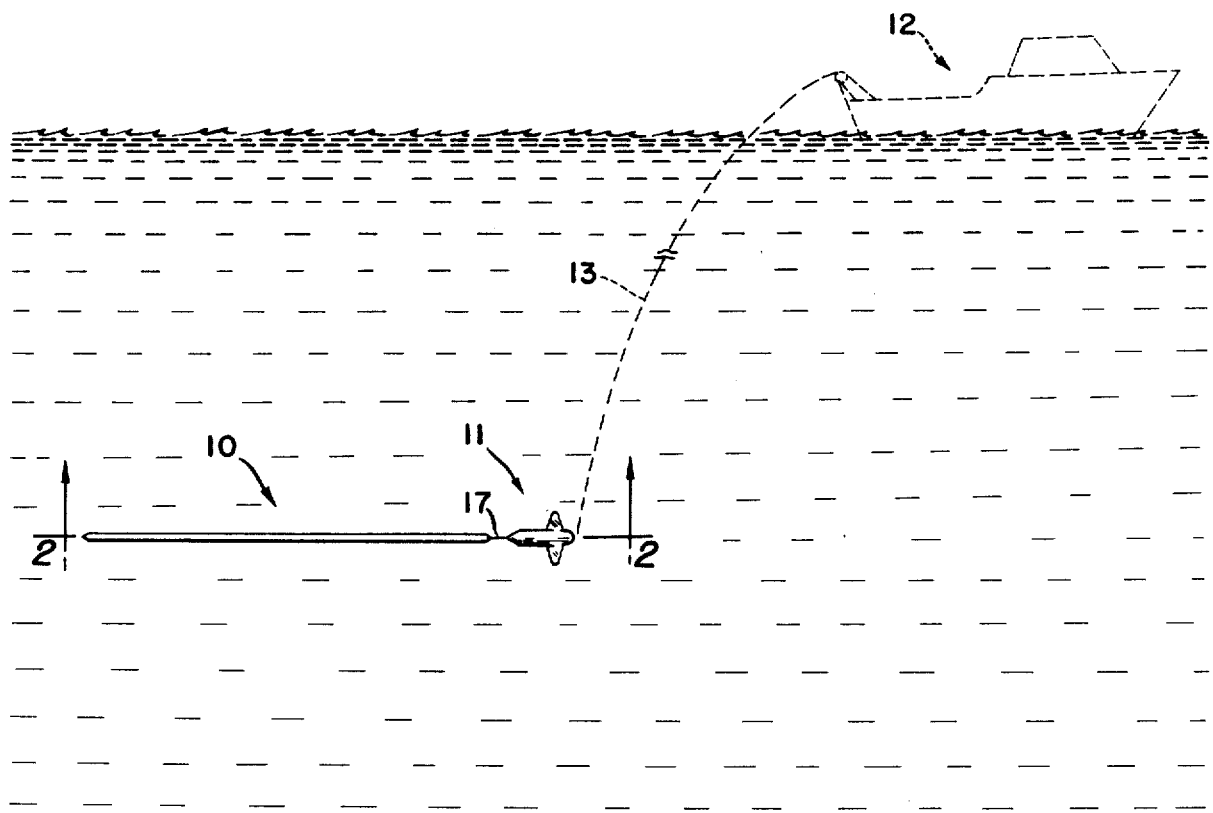
FIG. 1 depicts the invention towed by a surface ship.

Referring now to the drawings, FIG. 1 shows the invention, a line array sonar 10, trailing a paravane-like device 11, which is, in turn, pulled through the water by a ship 12 via an interconnecting cable 13.

The paravane is generally of conventional design, having an elongate body which maintains a controlled attitude by reason of vanes 11a, which are coupled to instrumentation 11b carried in the head of the paravane. As such, the instrumentation is well into the state-of-the-art and has been employed for some time to articulate the vanes properly to locate the paravane at a preselected depth. In addition, varying the towing speeds and cable length are alternate means for placing the paravane at its desired depth. A compartment 11c is included in an extended portion of the paravane and a number of holes 11d allow the flooding of the compartment, the reason for which will be elaborated on below.

The line array contains a number of elements which, at first glance, appear to be rather conventional in design. An elongated protectve sheath 140 is provided with a number of pressure compensating holes 14a for permitting a pressure transfer between the water medium and internally carried elements. The outer surface of the protective sheath is free from proturbences and normally presents a streamlined outer configuration to reduce the problems associated with flow noise and turbulence. The sheath is fashioned from a rubber-like material having a sufficient toughness to protect the other elements of the array from damage during deployment and retrieval. The sheath also is selected to have suitable properties for transmitting and receiving acoustic energy.

A cap member 15 and a cone-shaped tail member 16 close opposite ends of the sheath and all together they complete the exposed surfaces of the line array. Both members are rigid and, preferably, are molded or machined from stock which resists the corrosive effects of the surrounding water. A pad eye linkage 17 integrally extends from, or is otherwise suitably connected to the cap member to couple the array and the paravane.

Inside the sheath a plurality of transducer elements 18 are tandemly arranged in a spaced relationship. Irrespective that the drawings show only a few transducer elements, it is to be understood that as few as 2, or more than 50 elements are employed in a typical towed array within the scope of the invention. The exact number chosen, and their type, i.e. gas-filled or fluid-filled, is determined by the requirements of the job at hand.

The exact transducer element chosen for inclusion in the towed line array is not overly critical. Any of a number of transducer designs are selected which convert radial displacements to representative electrical signals when functioning in the passive mode, or project acoustic energy by reciprocal radial excursions in response to applied diving signals. In any event, the transducer element should fit snugly inside the protective sheath and have some sort of longitudinal passageway for electrical conductors and for allowing a gas transfer throughout the array.

One highly satisfactory design for transducer element 18 is disclosed in the U.S. Pat. No. 3,718,897 entitled "High Fidelity Underwater Music Projector", issued to the present inventor, Dr. Frank R. Abbott on Feb. 27, 1973. When this transducer functions in the active mode, appropriate diving signals impart axial excursions to a ferroelectric stack which are translated to radially displace circumferentially disposed outer surfaces. When operation in the passive mode is called for, impinging acoustic energy causes reciprocal radial displacements of the outer surfaces which are transferred to axial excursions and the generation of responsive signals. The hollow interior of the Abbott transducer is either liquid-filled or gas-filled. The end cap members are either closed or open, the latter for defining a longitudinal passageway.

In the present invention, the open-ended configuration is selected so that a hollow interior forming an axial passageway 18a, runs the entire length of each transducer element. The axial passageway serves a two-fold purpose. First, it provides an opening through which the interior of the transducer element is pressure compensated and secondly, it serves as a passageway for a bundle of electrical conductors 19 electrically interconnecting successive ones of the transducer elements along the length of the array. For this purpose, each of the transducer elements has a pair of terminals 18b operatively interconnecting each transducer element to a remote control-monitor station on the surface.

To this point, if holes 14a in elongate protective sheath 14 are plugged or disregarded, what has been described is conventional and in general use. Obvious shortcomings are readily apparent. If the array is gas-filled, it trails responsively only at one preset depth. Above this depth, the array arcs upwardly and taken below this depth, the array collapses and droops. The consequent turbulence and flow noise renders such an array generally unacceptable. A fluid-filled array, which tends to trail more satisfactorily, sacrifices sensitivity. Because of these factors, there is a tendency to give line arrays a wide berth and to pursue other designs.

Immediately inside sheath 14 an elongate sleeve 20 extends between cap member 15 and the tail member 16. The sleeve is appropriately coupled to seal a gas-filled interior 20a from the ambient water medium. The sleeve's inner diameter is dimensioned to abut the circumference of each of the transducer elements 18 and is suitably affixed to the cap and tail members.

The sheath has a degree of elasticity to bulge outwardly when gas filled interior 20a is coupled to a pressurized gas source. A semi-rigid tubulate 21 accomplishes this as it extends through cap number 15 to join the gas-filled interior in fluid communication with a compliant bladder 22 carried in compartment 11c of the paravane.

The walls of th compliant bladder are selected from any one of a variety of commercially available watertight elastomers such as rubber. It is at the essence of the present invention that the stiffness of the elastomer bladder 22 be less than the stiffness of the elongate sleeve 20. Having the bladder be less stiff than the elongate sleeve ensures that it collapses first as greater depths are reached. This passes pressure compensating gas to the array and prevents any distortion in the line array as it is deployed to a predetermined operational depth.

This reduced stiffness is created by using different materials having varying degrees of stiffnesses. In the alternative, the same materials is used for the elongate sleeve and the compliant bladder if the walls are made thinner in the bladder with respect to the sleeve.

Looking to the drawings, FIG. 2a shows the invention at the surface. Compliant bladder 22 is nearly completely filled with gas and a slight over-pressure is transmitted to gas-filled interior 20a via tublet 21.

As the paravane is pulled through the water, suitable articulation of vanes 11a by interconnected instrumentation section 11b begins to lead the array down toward its operational depth, see FIG. 2b. The less stiff bladder 22 begins to collapse as it is compressed by the increasing ambient pressure transmitted through several holes 11d in the paravane structure. Gas from the compliant bladder interior is forced into gas-filled interior 20a via tublet 21. The slight over pressure in the array causes the tail end of the array to arc upward. Turbulence and flow noise are at objectionable levels.

Figure 2C:
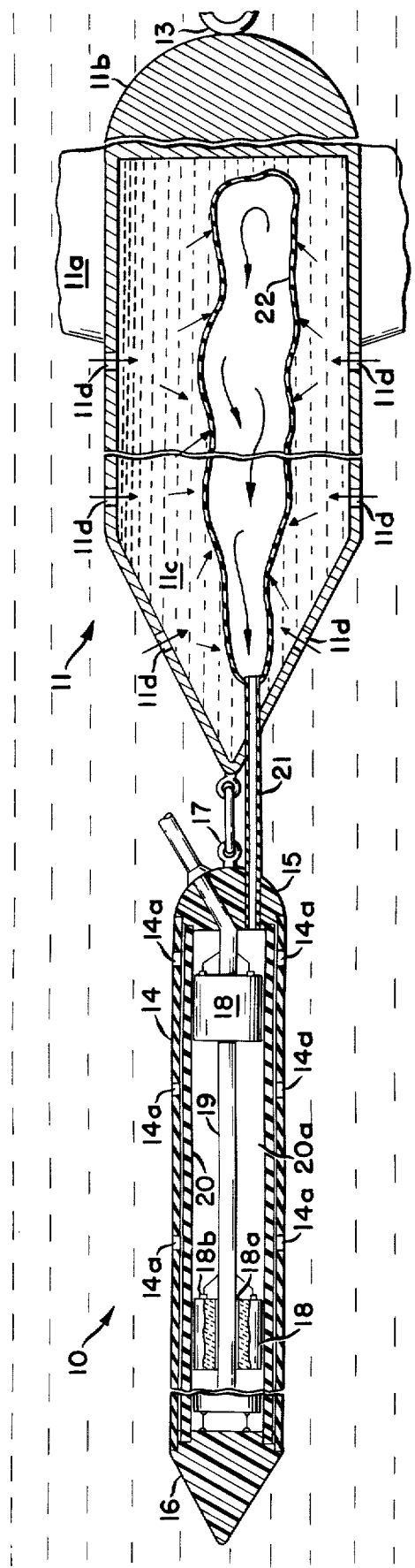
FIG. 2c is a cross-sectional representation of the invention taken generally along lines 2—2 in FIG. 1 as it is deployed at its operational depth.

FIG. 2c depicts the array being towed at its operational depth and trailing the paravane responsively. At this depth the vanes are actuated to maintain a level attitude and the gas remaining in the compliant bladder is sufficient to offset the weight of the paravane. At the same time, the buoyancy of gas-filled interior 20a supports the weight of the other elements of the array. It is noted that there is a sufficient pressure in thee gas-filled interior to streamline the array's shape and to thereby avoid the problems associated wth excessive flow noise.

The predetermined operational depth is established by the designing of relative volumes inside the array and the bladder with respect to the weights they must support. If, for example, a deeper operational depth is required for a particular application then obviously the internal volume of the compliant bladder 22 is made greater to provide the volume of compressed gas necessary to maintain the elongate sleeve 20 in a filled, streamline appearance. Of course, the total length of cable 13 and the towing speeds must be considered.

Figure 2D:
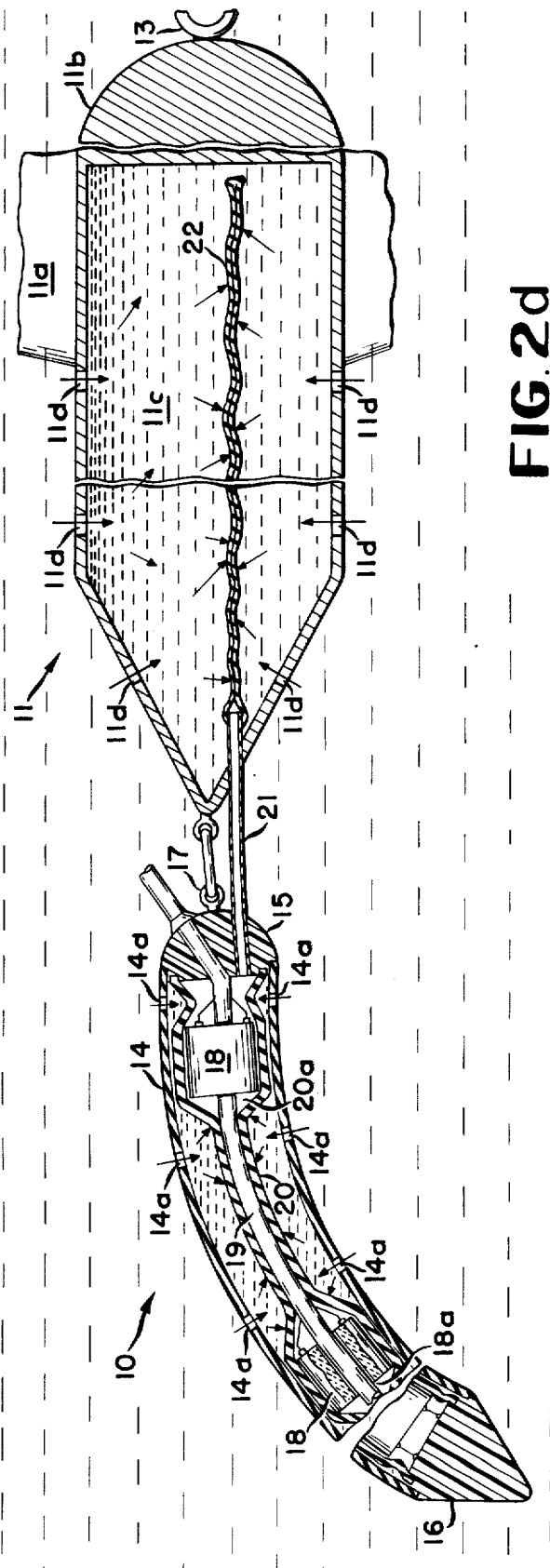
FIG. 2d is a cross-sectional representation of the invention taken generally along lines 2—2 in FIG. 1 as the invention sinks below its preset depth.

FIG. 2d depicts the invention operating below its operational depth. Notice that all the gas has been evacuated from the compliant bladder and it is totally collapsed. Notice also that a series of constrictions are formed along the line array. These constrictions by themselves contribute to the generation of excessive flow noise and because the line array is no longer self buoyant along its length, the tail end of the array droops to create more noise.

Obviously, many modifications and variations of the present invention are possible in the light of the above teachings, and it is therefore understood that within the scope of the disclosed inventive concept, the invention may be practiced otherwise than specifically described.

What is claimed is:

1. An improved transducer of acoustic energy comprising:
    an elongate sleeve enclosing a gas-filled space and having a first stiffness;
    a plurality of cylindrically shaped transducer elements longitudinally spaced in the elongate sleeve each sized to occupy the inner diameter of the elongate sleeve having a hollow interior in communication with the gas-filled space;
    means coupled to the elongate sleeve for compliantly defining a gas-filled chamber and having a second stiffness which is more compliant than the first stiffness of the elongate sleeve means, as the elongate sleeve and the chamber defining means are subjected to the same ambient pressure changes, the more compliant chamber defining means yields before the elongate sleeve to transfer gas between its chamber and the hollow interior of each transducer element thereby pressure compensating each transducer element and the material forming the elongate sleeve having the first stiffness and the material forming the chamber defining means having the second stiffness are selected to render the improved transducer essentially neutrally buoyant at a preset depth; and
    means coupled to the elongate sleeve for towing the elongate sleeve at the present depth in a water medium, the chamber defining means is carried within the towing means and is in communication with the water medium.

2. An improved transducer according to claim 1 in which the towing means is a paravane provided with openings for putting the chamber defining means in communication with the water medium and the chamber defining means is a flexible bladder.

3. An improved transducer according to claim 2 further including:
    an elongate sheath co-extensively carried on the outer surface of the elongate sleeve and having holes spaced along its length for putting the elongate sleeve in communication with the water medium.

4. An improved transducer according to claim 3 in which the elongate sleeve, elongate sheath and flexible bladder are rubber having respectively different degrees of stiffness.

* * * * *